May 10, 1966 YAOHAN CHU 3,251,041

COMPUTER MEMORY SYSTEM

Filed April 17, 1962 3 Sheets-Sheet 1

INVENTOR
YAOHAN CHU

BY Hurvitz & Rose

ATTORNEYS

INVENTOR
YAOHAN CHU
BY Hurwitz & Rose
ATTORNEYS

COMPUTER MEMORY SYSTEM

Filed April 17, 1962

3 Sheets-Sheet 3

INVENTOR

YAOHAN CHU

BY Hurwitz & Rose

ATTORNEYS

United States Patent Office 3,251,041

Patented May 10, 1966

3,251,041

COMPUTER MEMORY SYSTEM

Yaohan Chu, Chevy Chase, Md., assignor to Melpar, Inc., Falls Church, Va., a corporation of Delaware Filed Apr. 17, 1962, Ser. No. 188,183

12 Claims. (Cl. 340—172.5)

The present invention relates to electronic digital computers and more particularly to a computing system employing a medium-speed, large-capacity memory and a high-speed, low-capacity memory interconnected with one another and with the arithmetic circuitry of the computer such as to reduce the time required to perform a computation or sub-routine and to reduce the number of words required to be stored in the medium-speed, large-capacity memory for controlling the computation or sub-routine.

In a conventional digital computer the program required for performing a particular computation includes a series of instructions together with data to be employed in the computation. Both the data and instructions are stored in the memory of the computer and are called forth as required to perform the computation. Such machines originally employed three or four address instruction words and in a four address machine an instruction word contained information as to the locations of the two units of data to be processed, the location in which the answer derived from the processing was to be stored, and the location of the next instruction word. The three address instruction was more widely used and contained information relative to the location of the two units of data and the location in which the answer was to be stored. The instruction words were located in sequential address so that the machine was automatically stepped, by counting or other suitable means, from instruction-to-instruction.

As the requirements for memory capacity increased and the number of bits required to designate a memory location increased therewith, the number of bits available in the standard computer words became insufficient to designate more than one or two address locations within the memory. In consequence, most of the present large scale, that is, high capacity memory computers, employ a single address instruction which designates the location of one unit of data and may also designate the operation to be performed upon this unit. The next instruction word designates a second unit of information to be employed in a computation, and the next instruction called forth, all in sequence, designates the location in which the answer is to be stored. It is apparent that in such a system the number of references to the memory system are greatly increased over those required in a three address system and the number of words required for each computation is increased. Thus, as the size of a machine memory is increased and it is necessary to go from a three-address to a single-address system, some of the additional memory capacity provided is lost as a result of the need for more instruction words. Also the speed of computation is reduced due to the necessity for more references to the memory. The large memory systems which are economically feasible are by present standards considered to be medium speed memories and therefore the time required for each reference to such a memory becomes a determinative factor in the overall operation speed of the computer.

For purposes of clarification an example is given of a system employing a large-size, medium-speed memory employing a single address instruction of the type discussed above. The problem to be performed is:

$$Y=\frac{AX+B}{CX+D}+\frac{X^2}{2}$$

Table I is a program that may be employed to compute the factor Y when using most present day large scale computers. The program however is specifically directed to a fanciful machine called the Tydac, described in "Digital Computer Programming" by D. D. McCraken, John Wiley and Sons, published 1957. Referring specifically to Table I.

TABLE I.—A CONVENTIONAL COMPUTER PROGRAM

| Core Memory Address | Instruction | | Remarks | Memory Reference |
|---|---|---|---|---|
| 0000 | Clear Add | 1004 | X Acc [1] | 2 |
| 0001 | Multiply | 1002 | CX in Acc | 2 |
| 0002 | Acc Left | 0005 | Scale | 1 |
| 0003 | Add | 1003 | (CX+D) in Acc | 2 |
| 0004 | Store Acc | 1006 | (CX+D) 1006 | 2 |
| 0005 | Clear Add | 1004 | X Acc | 2 |
| 0006 | Multiply | 1000 | AX in Acc | 2 |
| 0007 | Acc Left | 0005 | Scale | 1 |
| 0008 | Add | 1001 | (AX+B) in Acc | 2 |
| 0009 | Acc Right | 0005 | Scale for division | 1 |
| 0010 | Divide | 1006 | (AX+B) (CX+D). | 2 |
| 0011 | Round | | Round-off | 1 |
| 0012 | Store Acc | 1006 | (AX+B)/(CX+D) 1006. | 2 |
| 0013 | Clear Add | 1004 | X in Acc | 2 |
| 0014 | Multiply | 1004 | $X^2$ in Acc | 2 |
| 0015 | Acc Left | 0005 | Scale | 1 |
| 0016 | Multiply | 1005 | $X^2/2$ | 2 |
| 0017 | Add to Mem | 1006 | $X^2/2+(1006)$ 1006 | 3 |
| 0018 | Halt Jump | | | 1 |
| | | | Total | 33 |
| | Data | | | |
| 1000 | A | | | |
| 1001 | B | | | |
| 1002 | C | | | |
| 1003 | D | | | |
| 1004 | X | | | |
| 1005 | 0.5 | | | |
| 1006 | Working Storage | | | |

[1] Acc means accumulator.

The table consists of four columns which are believed to be self-explanatory. It will be noted that in order to store a problem in the order it is to be performed by the machine, twenty-six memory locations must be utilized and the problem itself requires thirty-three references to the memory. It should be noted in Table I that the memory addresses contain only the significant bits of the address. If, for instance, the computer memory has a storage capacity of 32,000 words, which is the capacity of the system which will be described relative to the figures of the accompanying drawings, then the address words each require fifteen significant bits of information rather than the four bits shown in Table I.

In accordance with the present invention the number of references to a medium-speed memory of large storage capacity and the number of instruction words required to be stored in such a memory for a specific sub-routine or computational function are reduced. This reduction in memory references and memory requirements is achieved by employing a high-speed memory system having a relatively small capacity in addition to the medium speed memory system. In practice, an entire program may be initially stored in the medium-speed, large-capacity memory system. A specific sub-routine within this overall program is then transferred as one block of information by successive transfer operations to the high-speed, small-capacity memory. The information stored in the small-capacity, high-speed memory constitutes the entire program necessary for computing a specific portion of the overall program, for instance, the problem described above. Since the high speed memory is of small capacity, the number of bits required to designate a memory location therein may be considerably smaller than the number of bits required to designate a location in the medium-speed, large-capacity memory. In consequence, the length of each instruction word is smaller than that required by the high capacity memory and, in the example to be given herein, three instruction words for the low capacity memory may be stored as a single word in the large capacity memory. This then permits the number of instruction words that must be initially stored in the high capacity memory to perform a particular function to be reduced by a factor of slightly less than 3. In the example to be described, the high-speed, small-capacity memory system may employ a three address instruction and thus one instruction word in the small capacity memory is the equivalent of three instruction words in the large capacity memory.

In the system of the invention, the number of references which must be made to the large capacity memory for a given sub-routine is determined entirely by the number of words to be transferred to the small capacity memory from the large capacity memory. The program for transferring the problems set forth above from the large to the small capacity memory is reproduced in Table II.

TABLE II.—A DATA-SEQUENCED COMPUTER PROGRAM

| Core Memory Address | Local Address [1] | Program | | |
|---|---|---|---|---|
| 0000 | | | Transfer Instruction | |
| 0001 | 0 | 11 | 12 | 13 |
| 0002 | 1 | 14 | 15 | 16 |
| 0003 | 2 | 17 | 18 | 19 |
| 0004 | 3 | 110 | 111 | 112 |
| 0005 | 4 | 113 | 114 | 115 |
| 0006 | 5 | 116 | 117 | 118 |
| 0007 | 6 | 119 | | |
| 0008 | 7 | | A | |
| 0009 | 8 | | B | |
| 0010 | 9 | | C | |
| 0011 | 10 | | D | |
| 0012 | 11 | | X | |
| 0013 | 12 | | 0.5 | |
| 0014 | 13 | | Next data Seq. Address | |
| 0015 | 14 | | Working Register | |

[1] Local address refers to the address in magnetic thin-film memory when the data sequence is transferred to the thin-film memory.

The local address refers to the memory locations in the small-capacity memory to which the information in the large capacity memory is to be transferred. It will be noted that each instruction word in the large capacity memory is listed under the column designated program as three distinct instructions, for instance, $I_1$, $I_2$, $I_3$. The program discloses that only sixteen storage locations in the large scale memory are required to store the same program that required twenty-six memory locations if a single address memory were to be employed in conjunction with the large-capacity memory. Also the number of references to the medium speed memory is sixteen since the information is transferred from the medium speed memory to the high speed memory on a successive memory address basis. Since the number of references to the medium speed memory substantially controls the time required for computation, the reduction of memory references by a factor of approximately one-half permits the system to operate at a greater speed. It should be noted that on the transfer from the small-capacity to large-capacity memory only a single word, the answer to the problem, is normally transferred. Of course, under certain circumstances more than one word may be involved in this transfer but the number of such transfers is normally small.

As indicated above, a three address memory system may be employed relative to the high speed memory system although it is possible to employ a single address system in which the same type of program as disclosed in Table I would be employed. However, even here the time is greatly reduced since the high speed memory operates at a speed greatly in excess of the large capacity memory so that a substantial saving in time is still achieved.

TABLE III.—COMPARISON FOR THREE ADDITIONAL PROGRAMS

| Problem | Quantity | TYDAC | MM |
|---|---|---|---|
| Square Root | Program | 17 words | 10 words. |
| | Memory Reference | (6+17i) times | 10 times. |
| Sub-routine | Program | 40 words | 18 words. |
| | Memory Reference | (52+17i) times | 18 times. |
| Table look-up | Program | 113 words | 110 words. |
| | Memory Reference | (22+10i) times | (11+i) times. |

Referring to Table III additional comparisons between the number of words and the number of references which must be employed for specific problems when utilizing only a large capacity medium speed memory as opposed to the combination of the large capacity and small capacity high speed memories is illustrated. The column MM stands for the machine of the present invention or more particularly a multiple-memory machine. In the table the letter "*i*" represents the number of loop iterations required in a particular problem. In the square root problems, the advantage of the system is lost if the number of operations of the loop is more than the small capacity memory can store. In the present invention, however, the number of memory references is still less than that required in the machine of the TYDAC type. The sub-routine cited employs a calling sequence for the square rooting routine. The large difference in the number of memory references is again due to the square root routine; that is, the operations of the loop are all stored in the small scale memory requiring no references during this portion of the routine to the large-capacity memory. In the table look-up problem, the large number of references to the large memory in the Tydac column is due to the loop iterations required which, when employed in the machine of the present invention, are referred to the small scale memory.

The system of the invention is not restricted to a single large-capacity memory utilized in conjunction with a single high-speed memory. The medium speed memory may allocate different problems or sub-routines to various high-speed memory units and receive the answers back from these units, and store the answers for further processing or subsequent readout. In a system of this type, the high-capacity, medium-speed memory may serve as the only contact with the external circuits; that is, the input-output circuitry of the machine may be capable of supplying information either to the high speed memory or both the high speed and the medium speed memories.

An additional level of control through a low-speed memory may be supplied which permits an operator to take over control of the program or alter the flow of information between the memory systems described above. Specifically, an answer may be read out which indicates that the program should be altered. In such a case a further memory unit may be employed having an alternative partial program stored therein, and under the control of the operator, this information may be read in from the low speed memory or into the medium speed memory or alternatively directly into the high speed memory. The additional level of memory may also be employed for monitoring and checking.

The above and still further features and advantages of the present invention will become apparent upon consideration of the following detailed description of one specific embodiment thereof, especially when taken in conjunction with the accompanying drawings, wherein.

Figure 1:
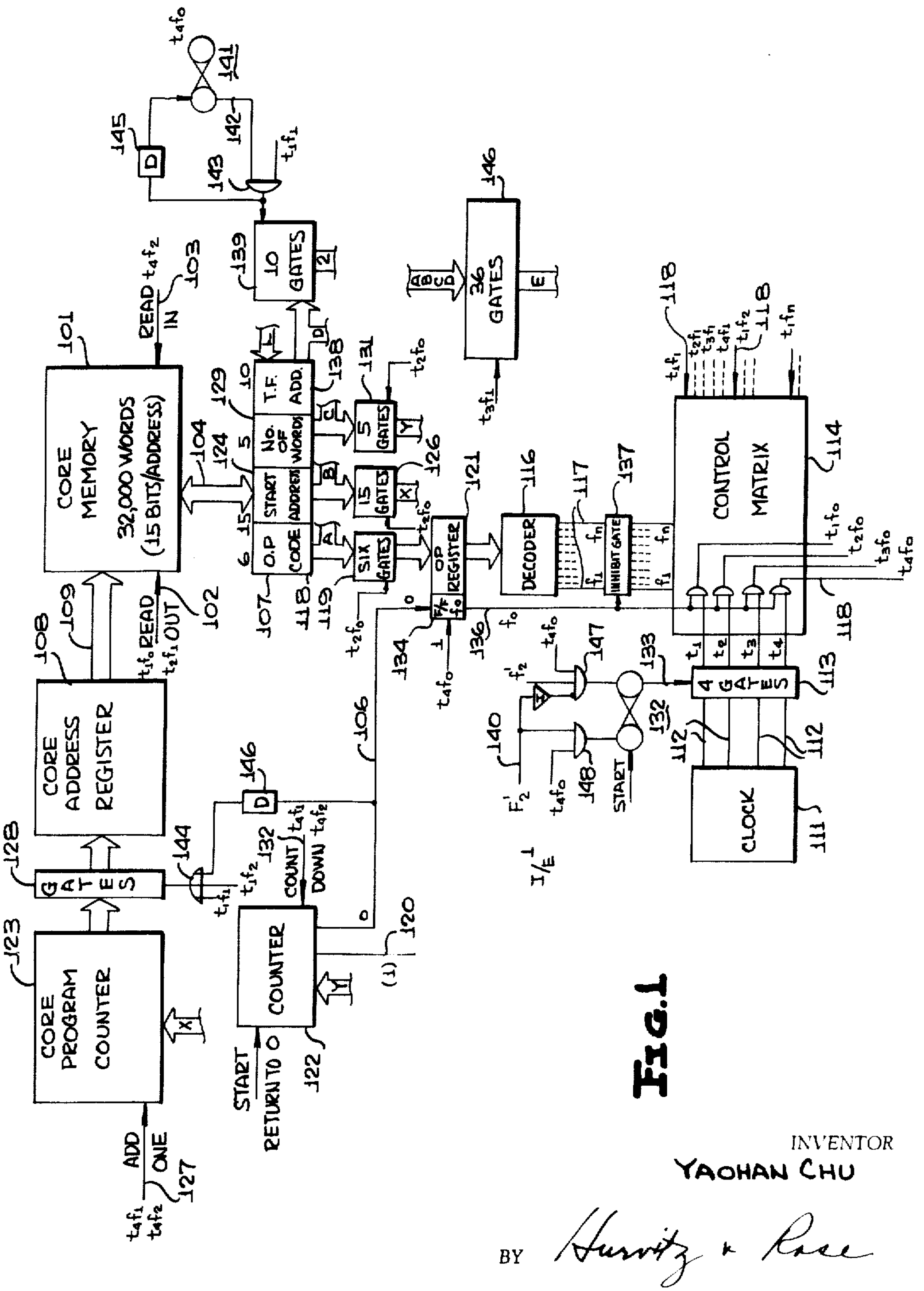
FIGURE 1 is a partial schematic and partial block diagram of a large capacity, medium or slow speed memory system employed in the present invention.

Referring now specifically to FIGURE 1 of the accompanying drawings, there is illustrated a slow or medium speed memory system employing a conventional memory unit 101 which may be a core memory, a drum memory, a magnetic tape memory or any other type of large-capacity memory unit. Preferably the unit 101 should be a medium-speed memory and will be described for purposes of illustration and description as a 32,000 word, core-memory requiring a fifteen bit address word. Each memory word has thirty-six bits and in consequence cannot employ a three-address instruction. The memory 101 is provided with a lead 102 to which readout command pulses are applied and a lead 103 to which readin command pulses are applied. In the schematic drawing, the broad parallel lines leads and arrows, such as the arrow system 104, denotes numerous parallel flow paths while the single line leads such as the lead 106 denotes a single wire connection for conveying information serially.

The readout lead 102 when energized controls the parallel read-out of all the bits in a single word in the core memory 101 on a bit-by-bit basis to distinct locations or stages in a register 107 serving as a buffer between the remainder of the circuits of the system and the core memory 101. The read-in lead 103 when energized permits information to be transferred in parallel from the buffer or storage register 107 to a specific word location in the core memory. The location in the core memory from which or to which information is to be fed is controlled by a core memory address register 108 which applies the proper address signals to the memory 101 via multiple leads designated by the parallel lead 109. The memory system of FIGURE 1 illustrates only those portions of the system required for communication between the core-memory system of FIGURE 1 and the high-speed memory system of FIGURE 2. The gating circuits etc. which are required for presentation of information from an external source to the core memory 101 have been eliminated but such information may be fed from external circuits to the buffer 107 and then be synchronously gated into the core memory 101.

The operations within the core memory system of FIGURE 1 are synchronized by a clock 111 which develops successive timing pulses on four leads 112 applied via four parallel connected and-gates 113 to a control matrix 114. The control matrix is simply a series of and-gates; that is, diode gates, all of which are arranged for display purposes in vertical rows and horizontal columns. Only four of these gates are illustrated and all of the gates in the same horizontal column receive the same timing pulse whereas the successive gates in the vertical rows receive successive timing pulses from the clock 111 via the and-gates 113. The function to be performed by the system is applied, in the manner to be described subsequently, to a decoder matrix 116 which develops a voltage on one and only one of a plurality of output leads 117. Each of these output leads 117 is connected to all of the gates in a vertical row in matrix 114 so that, when one of the leads 117 is energized, successive pulses are developed on a plurality of output leads, designated by the reference numerals 118, depending upon which function is designated by the voltage on a lead 117.

The code for designating the specific function to be performed by the computer is stored initially in the core memory and when an instruction word is read from the core memory the function is gated to the six left-hand gates, designated by reference numeral 119, in the buffer register 107. This six bit code is gated at an appropriate time through six parallel connected and-gates 119 to an operations register 121 which applies the coded function to the decoder 116. As previously indicated, the decoder 116 develops a voltage on a single one of its output leads 117 depending upon the code applied thereto.

Figure 2:
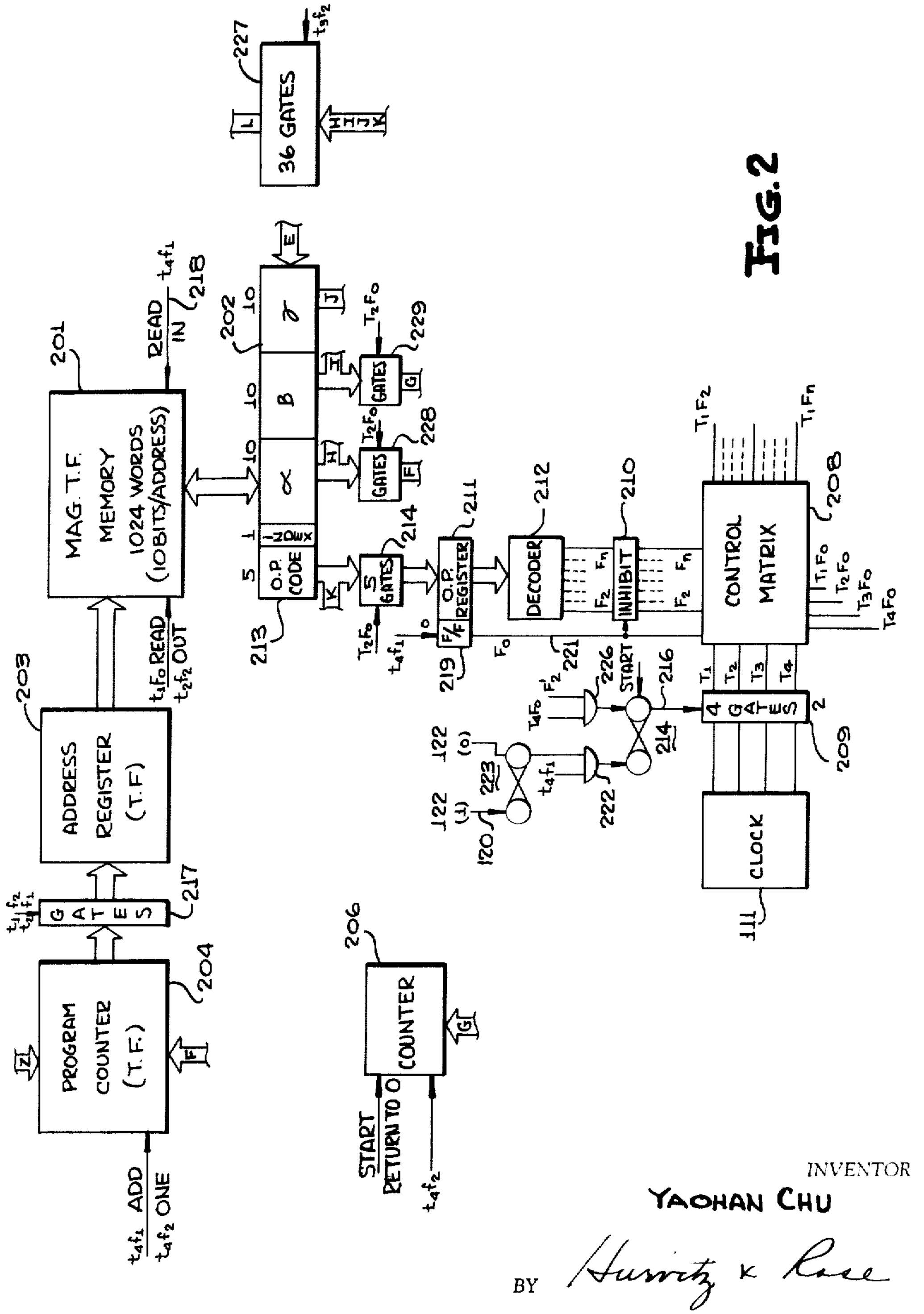
FIGURE 2 is a partial schematic and partial block diagram of a small capacity, high speed memory system employed in the present invention.

In addition to the elements described above, the system of FIGURE 1 is provided with a counter 122 employed in control of transfer of information between the memory systems of FIGURES 1 and 2. The system of FIGURE 1 further includes a core program counter 123 employed to increase the core memory address by one each time a transfer occurs from the system of FIGURE 1 to the system of FIGURE 2 and vice versa. The core program counter may of course be employed in other programs of the system but is described herein only in conjunction with the memory transfer functions. The address registered in the program counter is initially obtained from a group of fifteen gates 124 in the buffer register 107 and is applied in parallel to the core program counter 123 at an appropriate time via fifteen parallel connected and gates 126. The program counter 123 is provided with a count-up lead 127 so that the address stored in the core program counter 123 is stepped up at the end of each transfer of a word between the memory systems.

The counter 122 initially receives a count indicating the number of words to be transferred to the system of FIGURE 2 or vice versa and this is derived initially from a series of five parallel connected storage members 129 of the buffer 107. The number stored therein in binary form is applied via a series of five parallel connected and-gates 131 to the counter 122. Count down pulses for the counter are applied to a lead 132 at the end of each transfer operation. Thus, each time the transfer of a computer word has been effected, the counter 122 has its count reduced by one and the counter 123 has its address increased by one so that the next word to be transferred from the core memory 101 to the buffer 107 is the word stored in the address immediately adjacent to the address of the word previously stored. The address as previously indicated is then transferred through a series of timed, parallel-connected and gates 128 to the core address register 108 which stores the new address and determines the address of the core memory 101 from the next word to be transferred is to be taken.

Referring now specifically to FIGURE 2 of the accompanying drawings, there is illustrated the high speed memory system to which sub-routines are to be transferred from the core memory 101 of FIGURE 1. This memory system is identical in almost every respect with the system of FIGURE 1 and employs a memory unit 201 which may be a high-speed, transistor memory, a high-speed, core memory or one of the newer high-speed magnetic thin-film memories. Words to be either transferred from the memory 201 or into the memory 201 are initially stored in a buffer register 202 and the address from which the word is to be taken or to which it is to be routed is determined by an address register 203. The system of FIGURE 2 also employs a program counter 204 and a counter 206 which upon transfer of a word from the high speed memory system of FIGURE 2 to the lower speed memory system of FIGURE 1 determines the number of transfer operations to occur and terminates the transfer operation when this number of transfers has occurred. The counter 206 then serves the same function with respect to a transfer from FIGURE 2 to FIGURE 1 as counter 122 serves in a transfer of information from FIGURE 1 to FIGURE 2. Actually, in operation when the word is transferred from the system of FIGURE 2 to the system of FIGURE 1 both of the counters 122 and 206 are employed as a check against one another although this is not essential and the counter 206 may be eliminated as will become apparent subsequently.

The system of FIGURE 2 is timed by the clock 111 of FIGURE 1. The clock applies timing pulses to a control matrix 208 through four parallel gates 209 and the function to be performed is determined by an instruction word applied to an operations register 211. The word stored in the operations register 211 is fed to a decoder 212 which energizes one of a plurality of output leads to select which of the groups of four output leads from the control matrix 208 are to be successively energized. The instruction word is again derived from the buffer register 202 and more particularly from the five left storage locations 213 thereof. The instruction word is transferred through five timed and parallel connected and-gates 214 to the register 211.

Describing the operation of the preesnt invention and reference must now be made to both FIGURES 1 and 2, it is initially assumed that a start pulse is applied to the apparatus. When the start pulse is applied to the apparatus, a pulse is applied to both of the counters 122 and 206 returning their counts to zero. Concurrently a pulse is applied to a flip-flop 132 so as to cause its left hand stage to conduct and produce a high or gating voltage to appear on an output lead 133 from its right hand stage. This voltage opens the four and-gates 113 permitting the timing pulses to be applied to the control matrix 114. Concurrently a start pulse is applied to the right stage of a flip-flop 214 which causes the voltage on output lead 216 to be reduced thereby to close the and-gates 209 and prevent timing pulses from being applied from the clock 207 to the control matrix 208 of the high speed memory system of FIGURE 2.

When the counter 122 is returned to zero by the start pulse, it develops a voltage on its output lead 106 which is applied to a flip-flop 134 to cause the flip-flop to develop a gating voltage on its output lead 136. The voltage on the lead 136 applies an inhibit voltage to a series of inhibit gates 137 connected between the decoder 116 and the control matrix 114 so that any information stored in the operations register 121 cannot be applied to the control matrix. Therefore, the output signals from the control matrix 114 at this time are unaffected by a previous code that may be stored in the operations register 121. The high voltage developed on the lead 136 is applied to the left vertical row of and gates in the control matrix 114 and permits the four timing pulses to be gated through the control matrix to the output leads 118 associated with the four left gates. The four output leads from the left hand vertical row of gates are successively energized in accordance with the timing pulses. For purposes of simplicity of further description the four timing pulses are designated as $t_1$, $t_2$, $t_3$, and $t_4$ and the output voltage on the lead 136 is designated as $f_0$. The pulses appearing on the output leads 118 associated with the four left gates of the control matrix are designated $t_1f_0$, $t_2f_0$, $t_3f_0$ and $t_4f_0$.

The timing pulse $t_1f_0$ is applied to the readout lead 102 of the core memory 101 and reads out to the buffer 107 the next instruction to be performed by the memory system. The word in the address register 108 selects the new instruction to be performed and may be derived from various sources. If the machine has just been put into operation, which is in accordance with the example being considered, then the programmer provides the address and it may be gated into the address register 108 by means of the start pulse. If the transfer function arises at some other time, the address may be the next higher address in the core memory 101 and can be derived by adding one to the prior address at the end of the prior function. On the other hand, the address may be stored in a separate register somewhere in the machine and transferred into the core address register 108 at some appropriate time as determined by other functions and control signals in the system. In any event, the instruction word at the address location called for by the address register 108 is transferred from the core memory 101 to the buffer 107 when the $t_1f_0$ pulse appears. The $t_2f_0$ pulse performs three distinct functions. The operations code appearing in the location 118 of the buffer register 107 is transferred through the six parallel and gates 119 to the operation register 121 for future use. When it is desired to transfer information from the memory of FIGURE 1 to the memory of FIGURE 2 the code produces a signal indicated by $f_1$ on the output leads 117 of the decoder 116. The $t_2f_0$ pulse also effects transfer of the start address; that is, the address of the first word to be transferred to the core of FIGURE 2, is transferred to the core program counter 123. This is accomplished by applying a gating pulse to the fifteen parallel connected and gates 126. The number of words to be transferred during the memory transfer function is stored, as previously indicated, in the section 129 of the buffer register 107 and is gated by the $t_2f_0$ pulse through the and-gates 131 to the counter 122.

The final portion of the buffer register 107 which is designated by reference numeral 138 carries the address in which the first word to be transferred is to be located in the memory unit 201 of FIGURE 2. This address is not employed at this moment.

The pulse $t_3f_0$ is not employed and the next pulse to be considered is the $t_4f_0$ pulse. The $t_4f_0$ pulse sets the flip-flop 134 such that voltage is removed from the lead 136 and the inhibit gates 137 are opened so that the lead 117 selected by the instruction word is energized to permit successive timing pulses to be gated through its associated gates. In the function being considered, the $f_1$ lead is energized and as a result upon the application of successive clock pulses, the $t_1f_1$ through $t_4f_1$ leads are energized.

The third function of the $t_4f_0$ pulse is to prime a series of ten and-gates 139 which control transfer to the system of FIGURE 2 of the first address of the memory unit 202 in which a word is to be located. The pulse $t_4f_0$ is actually applied to a flip-flop 141 causing a gating voltage to appear on its output lead 142 applied to an and-gate 143. The gate cannot pass a pulse at this time but it is primed to pass a pulse when the $t_1f_1$ pulse occurs.

Since the $f_1$ function has been selected; that is, the function calling for a transfer from the memory unit of FIGURE 1 to the memory unit of FIGURE 2 the next pulse to be considered is the $t_1f_1$ pulse. This pulse is applied through an or-gate 144 to the and-gates 128 so that the address of the first word to be transferred to the system of FIGURE 2 is placed in the core address register. The pulse $t_1f_1$ is also applied to the and-gate 143, opening the ten parallel connected gates 139, so as to transfer the address of the first word to be applied to the high speed memory to be gated to the program counter 204. The output pulse from the and-gate 143 is fed back through a suitable delay line 145 to the flip-flop 141. This resets the flip-flop and prevents subsequent $t_1f_1$ pulses from affecting the gates 139. This pulse also sets the flip-flop 219 to its zero state so that a gating voltage appears on its output lead 221. The flip-flop 219 in function corresponds to the flip-flop 134 of the FIGURE 1 and closes inhibit gates 210 so as to isolate the control matrix 208 from the decoder 212. The pulse $t_2f_1$ performs two functions. It is applied to the readout lead 102 of the core memory unit 101 so that the first word to be transferred to the high speed memory is applied to the buffer register 107. This pulse is also applied to a series of parallel connected and-gates 217 so that the first address of the high speed memory 201 is transferred from the program counter 204 to the address register 203. The pulse $t_3f_1$ is applied to a series of thirty-six and-gates 146 through which the word appearing in the buffer register 107 is transferred to the buffer register 202 of the memory system of FIGURE 2. The pulse $t_4f_1$ has a number of functions, one of which is to cause the word appearing in the storage buffer 202 to be transferred to the high speed memory 201. Specifically, this pulse is applied to a read-in lead 218 of the memory unit 201 which causes the transfer function to occur. The pulse $t_4f_1$ also adds one to the core program counter 123, adds one to the high-speed memory counter 204 and subtracts one from the core counter 122.

The $t_1f_1$ through $t_4f_1$ sequence repeats itself until the count in the core counter 122 reaches a zero count. On the transfer function immediately prior to that which causes the counter 122 to reach a zero count, an and-gate 222 is primed to pass the next $t_4f_1$ count. When the counter 122 reaches a count of one a voltage is developed on a lead 120 and is applied to a flip-flop 223. The flip-flop 223 develops a gating voltage on an output lead 224 so that when the next $t_4f_1$ pulse is generated, this occurring at the end of a last transfer operation to the memory system of FIGURE 2, the gate 222 passes a pulse and the flip-flop 214 is switched. A gating voltage appears on its output lead 216 and the gates 209 are opened. Clock pulses are now gated to the control matrix 208 of the system of FIGURE 2 starting with the next $t_1$ pulse. Capital letters are employed for indicating timing pulses and instructions to distinguish from pulses developed in FIGURE 1. The flip-flop 223 is reset by the zero count generated by the core counter 122 to be set for the next operation of this type.

The zero pulse generated by the core counter 122 is also applied via a delay line 146.1 to the or-gate 144 so as to transfer the new address from the core program counter to the core address register. The delay line 146.1 must provide a sufficient delay only for the new count to be fully registered in the counter 123. The zero signal appearing on lead 106 is also applied to the flip-flop 134 so as to provide a voltage on the lead 136. This then will cause the core memory system to call forth a new instruction from the core memory and start a new sequence of operation in this unit which is not related to the system of FIGURE 2. The memory systems of FIGURES 1 and 2 are now isolated from one another and can operate independently. In the system of FIGURE 2, the $F_0$ cycle now calls forth the first instruction from the memory system 201 and the system proceeds with its own internal operation which is discussed in greater detail subsequently.

When the sub-routine assigned to the memory system of FIGURE 2 has been completed and it is desired to transfer the answer or answers thereto to the memory system of FIGURE 1 the following sequence of operations must occur: It is apparent that both systems must be ready for this transfer operation. Specifically, the memory unit of FIGURE 1 must receive an instruction from its own core memory unit 101 which calls for a transfer of information in the system of FIGURE 2 back to the core memory and secondly the core memory must be ready for such a transfer. Of course, it may be that the memory of FIGURE 2 is ready to make the transfer before the core memory of FIGURE 1 calls for it and both cases of ambiguity must be accounted for so that a transfer occurs only when both units are in a condition to accept such a transfer. Assuming the core memory 101 calls for such a transfer, an $f_2$ function is generated by the decoder 116. More particularly, the $f_2$ code is the code employed to designate a transfer from the high speed memory to the lower speed memory. The flip-flop 134 is set at the start of each new functional sequence to the zero state which provides a voltage on the lead 136 blocking the gates 137 and applying the $f_0$ input to the control matrix 114. At the time $t_1f_0$ an instruction word is read out of the core memory 101 into the buffer register 107 from an address which has previously been placed in the core address register 108. This is accomplished by suitable circuitry, the apparatus of which does not form a part of the controls of the present invention. At the time $t_2f_0$ the operations code is fed to the operations register and causes the $f_2$ lead 117 to be energized. Concurrently, the start address is applied to the core program counter 123 and the number of words to be transferred is applied to the core counter 122. Again the $t_3f_0$ signal is not employed. The $t_4f_0$ signal in combination with the $f_2'$ signal (the signal appearing on the $f_2$ lead 117 but blocked by inhibit gate 137) and the lack of an $F_2$ signal on lead 142 (which when present inhibits gate 147) produces a pulse through and-gate 147 to the flip-flop 132. This causes the righthand stage of the flip-flop 132 to conduct and removes the gating voltage from the lead 133. The $F_2$ signal is developed by the memory system of FIGURE 2 only when the system has been placed in a condition to transfer information from the high speed memory to the lower speed memory. If the system is not in a condition to make the transfer a signal is not applied to the $F_2$ lead 140 of FIGURE 1 and therefore an inhibit input signal to the gate 147 is not developed and the gate passes a pulse. The $f_2'$ voltage as previously indicated is taken directly from the output leads of the decoder 116 before these leads are applied to the inhibit gates so that this information is available as soon as the operations code is applied to the operations register, this occurring at the time $t_2f_0$. The memory system of FIGURE 1 under the circumstances set forth above is isolated from its clock 111 and therefore the system is shut down and is on a stand-by basis until such time as the high speed memory unit of FIGURE 2 is in a condition to transfer information to the FIGURE 1 system. It will be noted also that, under the circumstances set forth above, if the FIGURE 2 system had been ready for a transfer before the FIGURE 1 system, the $f_2'$ signal would not be available and the system of FIGURE 1 would continue operating until this signal was derived from the decoder 116 indicating that the system was ready for a transfer.

Turning now to the example under consideration, when the apparatus of FIGURE 2 has completed its arithmetic computation or finish whatever other problem had been assigned thereto by the system of FIGURE 1, the flip-flop 219 is set to the zero condition and an address is gated to the address register 203 such that the next instruction word to be called from the memory 201 is the transfer instruction. The pulse $T_1F_0$ causes this instruction word to be read from the memory 201 to the buffer register 202 and at time $T_2F_0$ the instruction portion of the word is read from the stages 213 of the register 202 to the operations register 211; the decoder 212 now developing the $F_2'$ function on one of its output leads. At the same time, the address of the first word to be transferred to the system of FIGURE 1 is fed to the program counter via gates 228 and the number of words to be transferred is fed via gates 229 to the counter 206. Both the core counter 122 and the counter 206 have the same count therein and act merely as a double check upon one another. If such a check is not desired, the counter 206 need not be employed in this operation. The pulse $T_3F_0$ is not used. The $T_4F_0$ pulse is applied to an and-gate 226 which in combination with the $F_2'$ voltage appearing on one of the direct output leads from the decoder 212 sets the flip-flop 214 such that the right hand stage conducts and gating voltage is removed from the lead 216. The clock 111 is now isolated from the system of FIGURE 2 and all further transfer operations are placed directly under control of the memory system of FIGURE 1. The $T_4F_0$ pulse is also applied to an and-gate 148 along with the $F_2'$ voltage developed from the output leads of the decoder 212. In consequence the $T_4F_0$ pulse is applied through the and-gate 148 to the flip-flop 132 causing its left stage to conduct. A gating voltage is now applied to the lead 133 so that upon the occurrence of the next $t_1$ pulse an output voltage is developed on the $t_1f_2$ output lead of the control matrix 114. The $t_1f_2$ pulse causes the address in the core program counter to be transferred to the core address register 108, the pulse $t_1f_2$ being applied through the or-gate 144 to the and-gate 128. Concurrently, the address of the first unit of information to be transferred out of the high speed memory 201 is gated through the gates 217 by pulse $t_1f_2$ to the address register 203. The pulse $t_2f_2$ reads out the first word from the memory 201 and applies it to the transfer buffer 202. The pulse $t_3f_2$ is applied to thirty-six and-gates 227 which pass the entire word in the register 202 in parallel form to buffer register 107 of the memory system of FIGURE 1. The pulse $t_4f_2$ causes the core program counter 123 and the high speed memory program counter 204 to add one to the previous address in each of these counters. The pulse $t_4f_2$ subtracts one from each of the counters 122 and 206 and concurrently causes the word in the buffer memory 107 to be transferred to the core memory 101 as a result of its application to the read-in lead 103.

The above cycle repeats itself until all of the words to be transferred from the one memory to the other have been so transferred. On the $t_4f_2$ pulse of this last transfer, both counters 122 and 206 revert to a zero count. This causes the flip-flop 134 to change to a one-count thereby inhibiting the gates 137 and blocking further action of the $f_2$ instruction. The zero pulse also causes the next address to be transferred from the core program counter to the core address register, it being assumed that the address of the next instruction to be carried out by the memory system of FIGURE 1 is located at an address which is only one greater than the last address to which a transferred word is applied. If this is not to be the case, then the zero pulse may be employed to gate an address from some other source into the core address register.

As previously indicated in the example employed to describe the present invention, the core memory 101 has a storage capacity of 32,000 words and therefore requires a fifteen bit code to designate a specific address. The basic word size is considered to be thirty-six bits and the buffer register 107 can accommodate thirty-six bits. In the initial transfer instruction (see Table II) which is stored at core memory address 0000 six bits are fed the the stages 118 of the register 107 and designate a transfer instruction. The next fifteen bits designate the start address; that is, the address of the first word to be transferred to the high speed memory. In Table II this address is designated as 0001 or in other words an address of fourteen zeros and a one in the least significant digit. The number of words to be transferred appear in the five stages designated 129 of the register 107. Consequently up to thirty-one words may be called for transfer at a given time. Since each word may contain three instructions, the number of instructions transferred can be quite large and certainly sufficient to perform, in this limited example, the problem set forth previously. If more than 32 words are to be transferred at any time, the next data sequence address 0014 of Table II must reference the memory 101 to bring forth another transfer instruction.

The high speed memory 202 is assumed capable of storing a thousand and twenty-four words and therefore a ten bit code is required to designate each address in this register. The shift register 107 provides ten stages in the section 138 of the register 107 which is employed, during a transfer operation, to designate the address to which the first word is to be directed in the high speed memory 201. It will be noted also that the register 213 may store thirty-six bits, and in consequence three address instructions may be employed. Referring to the register 213 in FIG-2, the alpha, beta and gamma addresses of the three instruction word indicated as being are stored in the three righthand sections of the register each bearing an indication of ten distinct words. A five bit operations code is employed and a one-bit index completing the thirty-six bits available in the word.

The operation of the memory system of FIGURE 2 in conjunction with an arithmetic unit is completely conventional and will be described in broad terms only.

Figure 3:
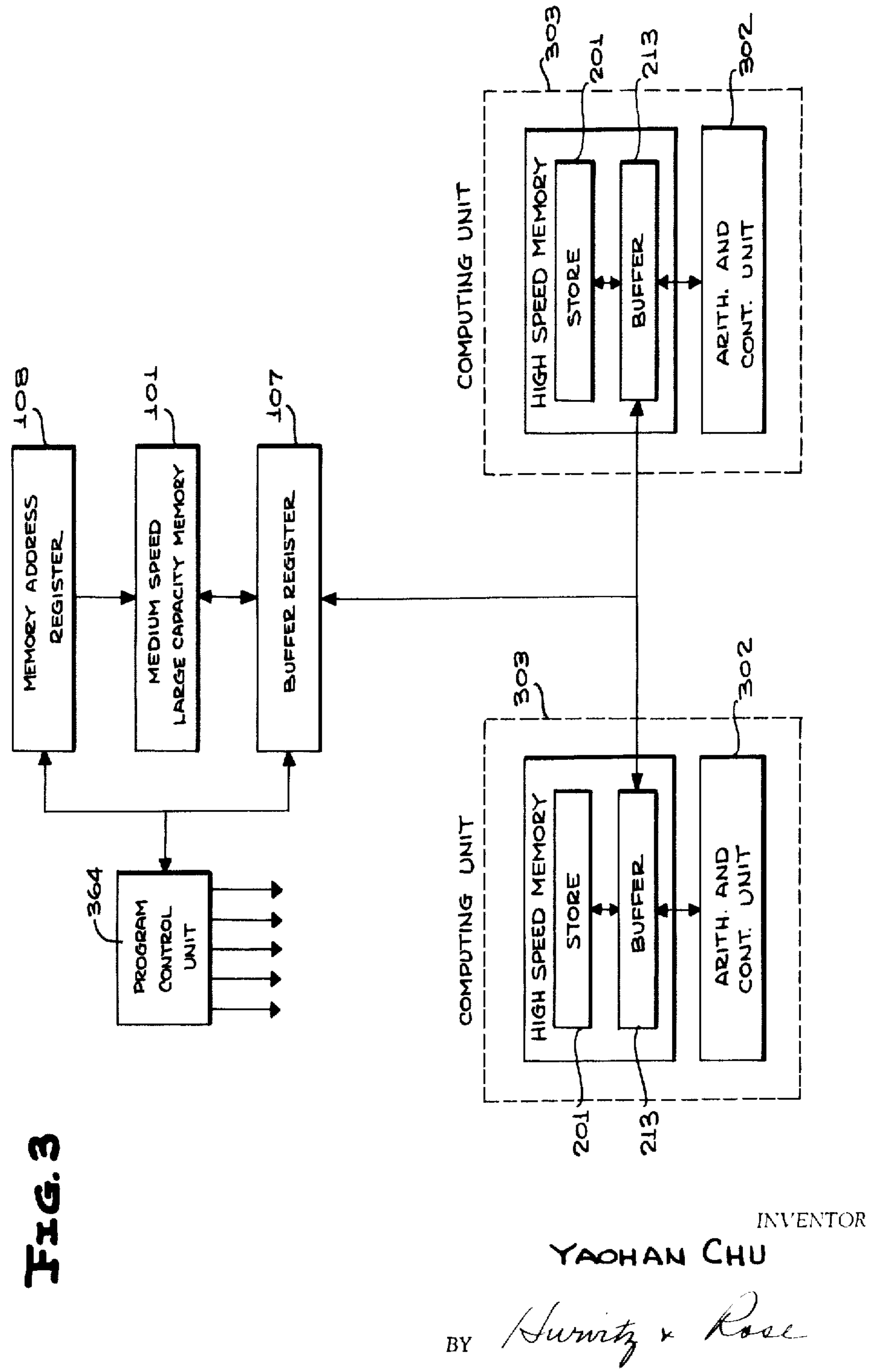
FIGURE 3 is a block diagram of a computing system employing the systems of FIGURES 1 and 2.

Referring now specifically to FIGURE 3 the high speed small capacity memory system of FIGURE 2, designated by reference numeral 301, is connected to communicate with an arithmetic and control unit 302 directly. The memory system 301 and the arithmetic and control unit 302 constitute a computing unit 303, enclosed within the dashed lines. Employing a conventional three-address system, if the apparatus were now to operate upon the first term (AX) of the aforementioned example would say take the quantity located at address 0008 (see Table II) multiply this by the quantity at memory location 0012 and store the answer in an accumulator. All operations of a three address system would follow this pattern in completely conventional form. Alternatively, the single address system may be employed and the same pattern employed in Table I could be programmed in the memory 201. However, since the memory 201 operates at a far greater speed than the memory 101, the amount of time required to perform this computation is considerably reduced and of course the circuitry required for handling the information is also considerably reduced.

It will be noted by reference to FIGURE 3 that communication to external circuits, is through a program control unit 304. The program control 304 has direct access to the buffer register 107 and from the buffer register directly into the large capacity memory 101. Alternatively, the system may be operated with an initial transfer directly from the buffer register 107 to the buffer register 213 of the high speed memory system of FIGURE 2 so that a first sub-routine may be supplied to the arithmetic unit while the large capacity memory is being filled with the remainder of a program.

Another important feature of the program control unit is that it need not be an external system but may constitute a low speed, very large capacity internal memory through which direct access can be had by an operator to the entire system. More particularly, and as briefly outlined previously, if the results obtained in a portion of the program indicate to an operator that a shift is to be made in the program either in the sequence in which information is to be processed or a complete change in a portion of the program, then by inserting appropriate information in the program control unit, the operator may, for instance, cause the system to skip an entire routine and take up another out of turn by placing a particular address in the address register 108. The system operates on the program called for by this new address and during this interval a portion of the large capacity memory 101 may be cleared of a prior problem and a new information or sub-routine or block of problems placed into the large capacity computers through the buffer register 107 or an alternative path.

Addition arithmetic units, as indicated in FIGURE 3, may be provided. An efficient use of such a system is to assign a sub-routine to a first arithmetic unit and, while it is being processed thereby, assigned a second sub-routine to the other arithmetic unit. When the first arithmetic unit is finished it may then supply the answer to the medium speed memory which may accumulate answers from all or some of the arithmetic units and assign the answers with instructions to one of the arithmetic units for further processing or supply the answers to the output equipment.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. An electronic digital computer comprising an arithmetic unit, a first signal responsive memory system, a second signal responsive memory system, said second memory system having a substantially smaller storage capacity, and a substantially more rapid rate of operation than said first memory system, means for transferring an entire sub-routine from said first memory system to said second memory system, said second memory system adapted to supply information from the sub-routine to said arithmetic unit for processing thereby and to store the computed results of said processing, and means for transferring the results computed in accordance with said sub-routines from said second to said first memory system.

2. An electronic digital computer comprising an arithmetic unit, a first signal responsive memory system, a second signal responsive memory system, said second memory system having a substantially smaller storage capacity, and a substantially more rapid rate of operation than said first memory system, means for establishing transfer operations between said memory systems, means for sequentially and successively transferring all of the computer words constituting a computer arithmetic sub-routine from said first memory system to said second memory system during a single transfer operation, said second memory system adapted to supply information to said arithmetic unit for processing thereby and to store the computed results of said processing, and means for transferring the results computed in accordance with said sub-routines from said second to said first memory system.

3. The combination according to claim 2 wherein said first memory system employs instruction words containing only one address and wherein the number of address locations in said second signal responsive memory system is sufficiently small that a single instruction word as stored in said first memory system may include at least three addresses of said second memory system.

4. The combination according to claim 3 wherein said second memory system employs a three address instruction word.

5. An electronic digital computer comprising a main memory unit and at least one computing unit; said at least one computing unit including a secondary memory unit of high operational speed and low storage capacity relative to the operational speed and storage capacity respectively of said main memory unit, and an arithmetic unit for performing prescribed operations on data words supplied thereto; means for shifting a selected data sequence in the form of a block of digitally coded words, comprising a group of data words and a set of instruction words for operating on the data words, from said main memory unit to said secondary memory unit in a single consecutive transfer operation, and for shifting the results of the computation performed in said computing unit on said data words in accordance with said set of instruction words to said main memory unit for storage thereby.

6. The combination according to claim 5 further including means for isolating said main memory unit from said at least one computing unit during the computation in said computing unit on said data words in accordance with said set of instruction words.

7. An electronic digital computer comprising a main memory unit and a plurality of computing units coupled to said main memory unit; each of said computing units including an auxiliary memory unit having low storage capacity and high operational speed relative to said main memory unit, and an arithmetic unit adapted to perform computations on data stored by the respective auxiliary memory unit in accordance with instructions supplied by said respective auxiliary memory unit; means for effecting the shift of a block of digitally coded words in the form of a data sequence comprising a group of data words and a set of instructions for operating on said data words from said main memory unit to the auxiliary memory unit of one of said computing units in a single transfer operation; means in the auxiliary memory unit for storing the result of the computations performed by the associated arithmetic unit; and means for effecting the transfer of computed results stored by the auxiliary memory unit to said main memory unit for further processing.

8. The combination according to claim 7 wherein is further included means for isolating said main memory unit from a computing unit during the interval in which computations are performed by that computing unit, whereby said main memory unit is available to communicate with other idle computing units during said interval.

9. The combination according to claim 7 wherein each of said auxiliary memory units comprises a plurality of storage locations each identified by a local address of substantially shorter word length than the address of each of the storage locations of said main memory unit, whereby each instruction word in a data sequence transferred to an auxiliary memory unit from said main memory unit may include a plurality of instructions for operating on the data words contained in that data sequence.

10. The combination according to claim 7 wherein the instructions in said data sequence are sequentially applied to said arithmetic unit by the associated auxiliary memory unit to effect the computation to be performed on said data sequence, and wherein one of said instructions is effective to shift the result of said computation by said arithmetic unit to a storage location in the associated auxiliary memory unit to await further processing.

11. An electronic digital computer comprising a main memory system, an auxiliary memory system of substantially lower storage capacity than said main storage system; said auxiliary memory system adapted to store at least one complete sub-routine program of digitally coded instruction words and data words comprising only a portion of the overall operational program stored by said main memory system and of sufficient scope to permit the desired computation within said overall program; means for effecting a transfer of said at least one sub-routine program from said main memory system to said auxiliary memory system in consecutive data sequences; each containing addressed multiple data words and multiple instructions and each being transferred in a single transfer operation; an arithmetic and control unit cooperatively associated with said auxiliary memory system for computing a result for said sub-routine program in accordance with the data and instructions transferred to said auxiliary memory system and for transferring that result to a prescribed address in said auxiliary memory system; and means for effecting a shift of the computed result for said sub-routine program from said auxiliary memory system for further processing.

12. The computer according to claim 11 wherein is included a plurality of auxiliary memory systems, each identical to the first named auxiliary memory system and each having associated therewith a separate arithmetic and control unit substantially identical to the first named arithmetic control unit; and wherein is further included means for isolating said main memory system from an auxiliary memory system during the computation and processing performed by its associated arithmetic and control unit, so that access is available to said main memory system by idle auxiliary memory systems during the execution of sub-routine programs by the active auxiliary memory systems and their respectively associated arithmetic and control units.

References Cited by the Examiner

UNITED STATES PATENTS

| | | | |
|---|---|---|---|
| 3,029,414 | 4/1962 | Schrimpf | 340—172.5 |
| 3,033,447 | 5/1962 | Buegler | 340—172.5 |
| 3,039,690 | 6/1962 | Yandell | 340—172.5 |
| 3,061,192 | 10/1962 | Terzian | 340—172.5 |
| 3,069,658 | 12/1962 | Kramshoy | 340—172.5 |

ROBERT C. BAILEY, *Primary Examiner.*

G. D. SHAW, *Assistant Examiner.*